(12) United States Patent
Yeh

(10) Patent No.: US 7,341,392 B2
(45) Date of Patent: Mar. 11, 2008

(54) LOCK DEVICE IN AN ARTICULATED JOINT FOR A FOLDABLE LADDER

(75) Inventor: Chin-Wen Yeh, Keelung (TW)

(73) Assignee: Dofair Co., Ltd., Keelung (TW)

( * ) Notice: Subject to any disclaimer, the term of this patent is extended or adjusted under 35 U.S.C. 154(b) by 0 days.

(21) Appl. No.: 11/735,518

(22) Filed: Apr. 16, 2007

(65) Prior Publication Data

US 2007/0201943 A1   Aug. 30, 2007

Related U.S. Application Data

(63) Continuation-in-part of application No. 11/111,593, filed on Apr. 22, 2005, now abandoned.

(51) Int. Cl.
*F16C 11/10* (2006.01)
*E06C 1/383* (2006.01)

(52) U.S. Cl. .............................. 403/93; 403/96; 403/13; 182/163

(58) Field of Classification Search ................. 403/13, 403/92–97; 182/163
See application file for complete search history.

(56) References Cited

U.S. PATENT DOCUMENTS

| | | | | |
|---|---|---|---|---|
| 4,474,264 A | * | 10/1984 | Krause ........................ | 182/163 |
| 4,540,306 A | * | 9/1985 | Wang ........................... | 403/93 |
| 4,602,889 A | * | 7/1986 | Mu-Shan ...................... | 403/91 |
| 4,645,371 A | * | 2/1987 | Wang ........................... | 403/93 |
| 4,770,559 A | * | 9/1988 | Yoo ............................. | 403/93 |
| 4,805,737 A | * | 2/1989 | Peng .......................... | 182/163 |
| 4,925,329 A | * | 5/1990 | Chuang ........................ | 403/93 |
| 5,022,118 A | * | 6/1991 | Wan-Li ........................ | 16/327 |
| 5,026,198 A | * | 6/1991 | Lin .............................. | 403/27 |
| 5,992,566 A | * | 11/1999 | Yeh ............................. | 182/163 |
| 6,688,797 B2 | * | 2/2004 | Park et al. .................... | 403/93 |
| 6,711,780 B2 | * | 3/2004 | Lee .............................. | 16/326 |
| 7,063,341 B2 | * | 6/2006 | Tsai ....................... | 280/87.041 |

\* cited by examiner

*Primary Examiner*—Daniel P. Stodola
*Assistant Examiner*—Joshua T Kennedy

(57) ABSTRACT

An articulated joint for a foldable ladder includes an outer casing pair, an inner casing pair pivotally moving with respect to the outer casing pair, a lock device composed of a lock block and a locating pin. The locating pin has a ball end to be slightly squeezed in the locating hole such that the ball end is capable of retained in the locating hole and pivotally joined to the locating hole. The lock block provides triangular prism shaped projections at two opposite long edges of the bottom side of the lock block. Hence, the lock block can move along the guide slot of the outer casing shells steadily and be pivotally joined to fixing pin without loosening apart from each other.

3 Claims, 4 Drawing Sheets

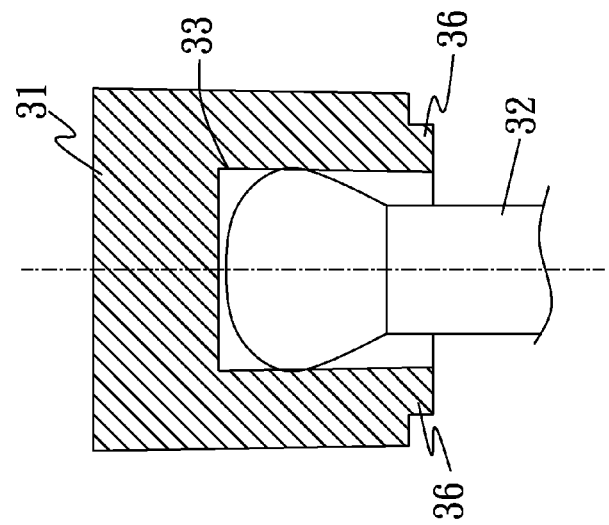
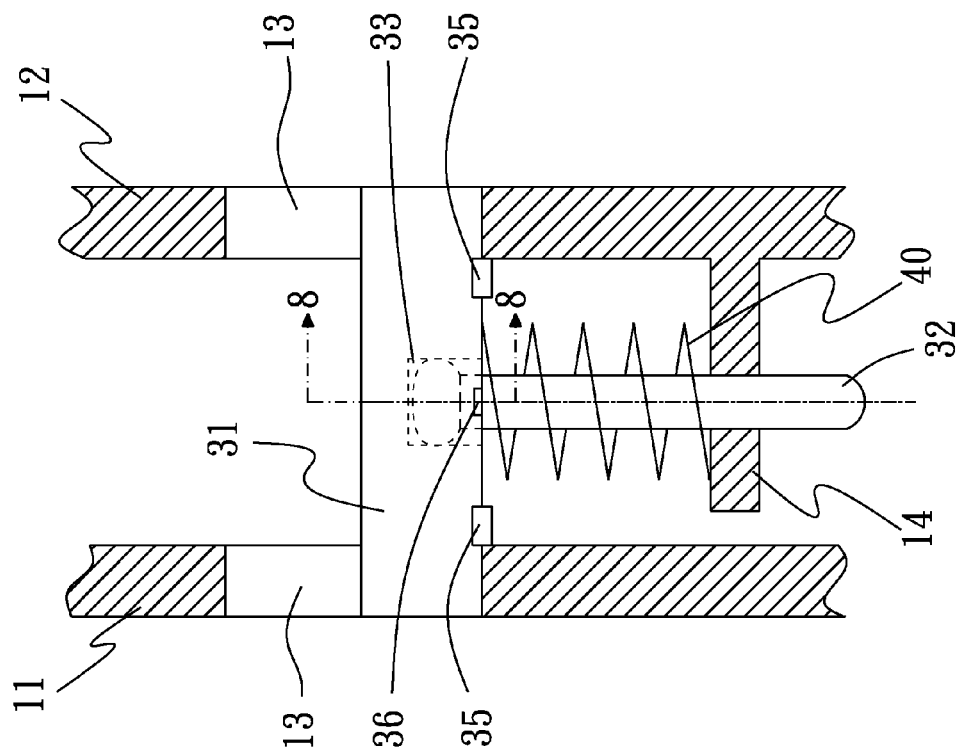

LOCK DEVICE IN AN ARTICULATED JOINT FOR A FOLDABLE LADDER

The application is continuation-in-part of application Ser. No. 11/111,593 filed Apr. 22, 2005 now abandoned.

FIELD OF THE INVENTION

The present invention relates to a lock device in an articulated joint for a foldable ladder and particularly to a lock device, which is capable of keeping the parts off loosening, for securing safety of the articulated joint while in use.

BACKGROUND OF THE INVENTION

Referring to FIG. 1, an articulated joint with a conventional lock device includes an outer casing pair 10, an inner casing pair 20, a lock block set 30, a spring 400, a trigger 50, a slidable element 70, a casing secure rivet 80 and a trigger locating rivet 90. The outer casing pair 10 is composed of two opposite outer casing shells 11, 12 and each of the outer casing shells 11, 12 has a circular upper section and an elongated lower section with a guide slot 13 at the intersection of the circular section and the elongated section and being disposed along radial direction of the circular section. A trigger locating hole 16 beside the sliding slot 13 near a lateral side of the respective outer casing shell 11, 12 for rotationally locating the trigger 50 with the trigger locating rivet 90. A secure hole 19 is provided at the bottom area of the lower section of the two outer casing shells 11, 12 for being fixedly attached to one of the rails on a ladder. Besides, the outer casing shell 12 has a spring seat 14 and the spring seat 14 is disposed below the guide slot 13 at the outer casing shell 12 with a pinhole 141 for locating the lock block set 300. The lock block set 300 includes a lock block 310, a fixing plate 350 and a locating pin 320. The lock block 310 has a blind hole at an elongated side thereof and the fixing plate 350 basically is a short U shaped sheet with a central through hole and two opposite extending outward lateral sides. The lock block 310 sits on the fixing plate 350 with the side having the blind hole aligning with the through hole of the fixing plate 350 and an end of the locating pin 320 enters the blind hole via the through hole and the pinhole 141 being passed through by another end of the locating pin 320. The spring 400 surrounds the locating pin 320 with an end of the spring 400 touching the spring seat 14 and another end of the spring 400 touching the lower side of the lock block 31. The inner casing pair 20 is composed of two opposite inner casing shells 21, 22. Each of the inner casing shells 21, 22 has an upper circular section and an elongated lower section too and provides three locating recesses 231, 232, 233 for catching the lock block 310. Further, each of the inner casing shells 21, 22 has three arc slots 24 for receiving three short pins 60 attached to the slidable element 70 and allowing the short pins 60 with the slidable element 70 moving along the arc slots 24. Further, the inner casing shell 22 has a locating tongue 25 at the lower part of the circular section thereof for locating an end of an extension spring 71, which has the other end thereof being attached to an end of the slidable element 70. The inner casing shells 21, 22 provide fixing holes 29 for being fixedly attached to a rail of another ladder part of the foldable ladder with rivets. In addition, the trigger 50 has the upper part contacting the lock block 310 and the top edge thereof pressing against the slidable element 70 at the lowermost short pins. The inner casing pair 20 and the outer casing pair 10 are rotationally joined together. Once the outer casing shells 11, 12 are joined to each other, a space is constituted between the upper circular sections of the outer casing shells 11, 12 for positioning the inner casing pair 20. While the trigger 50 is pressed to move the lock block 310 out of one of the locating recesses 231, 232, 233 and an angle between the outer casing pair 10 and the inner casing pair 20 can be adjusted till the lock block 31 enter another one of the locating recesses 231, 232, 233.

As the foregoing, the lock device, which is composed of the lock block 310, the fixing plate 350, the locating pin 320 and the spring 400, is detachable such that it is easy for the parts of the lock device become loosening apart from each other during the foldable ladder being in use. As a result, it is very possible to happen unexpected accident.

SUMMARY OF THE INVENTION

An object of the present invention is to provide a lock device in an articulated joint for a foldable ladder in which the lock block is slightly pivotally joined to a ball end of the locating pin and the lock block at the side joining with the locating pin provides four projections at two opposite long edges thereof so as to prevent the parts of the lock device from loosening and secure steadiness of the articulated joint for enhancing safety during the ladder being in use.

Another object of the present invention is to provide a lock device in an articulated joint for a foldable ladder in which simply and rapidly assembled parts are provided for easing fabrication job of the articulated joint.

BRIEF DESCRIPTION OF THE DRAWINGS

The present invention can be more fully understood by reference to the following description and accompanying drawings, in which:

FIG. 7 is a fragmentary sectional view illustrating the lock block 31 being in a state of being pressed downward against the biasing force of the spring 40; and FIG. 8 is a sectional view along line 8-8 shown in FIG. 7.

DETAILED DESCRIPTION OF THE INVENTION

Figure 1:
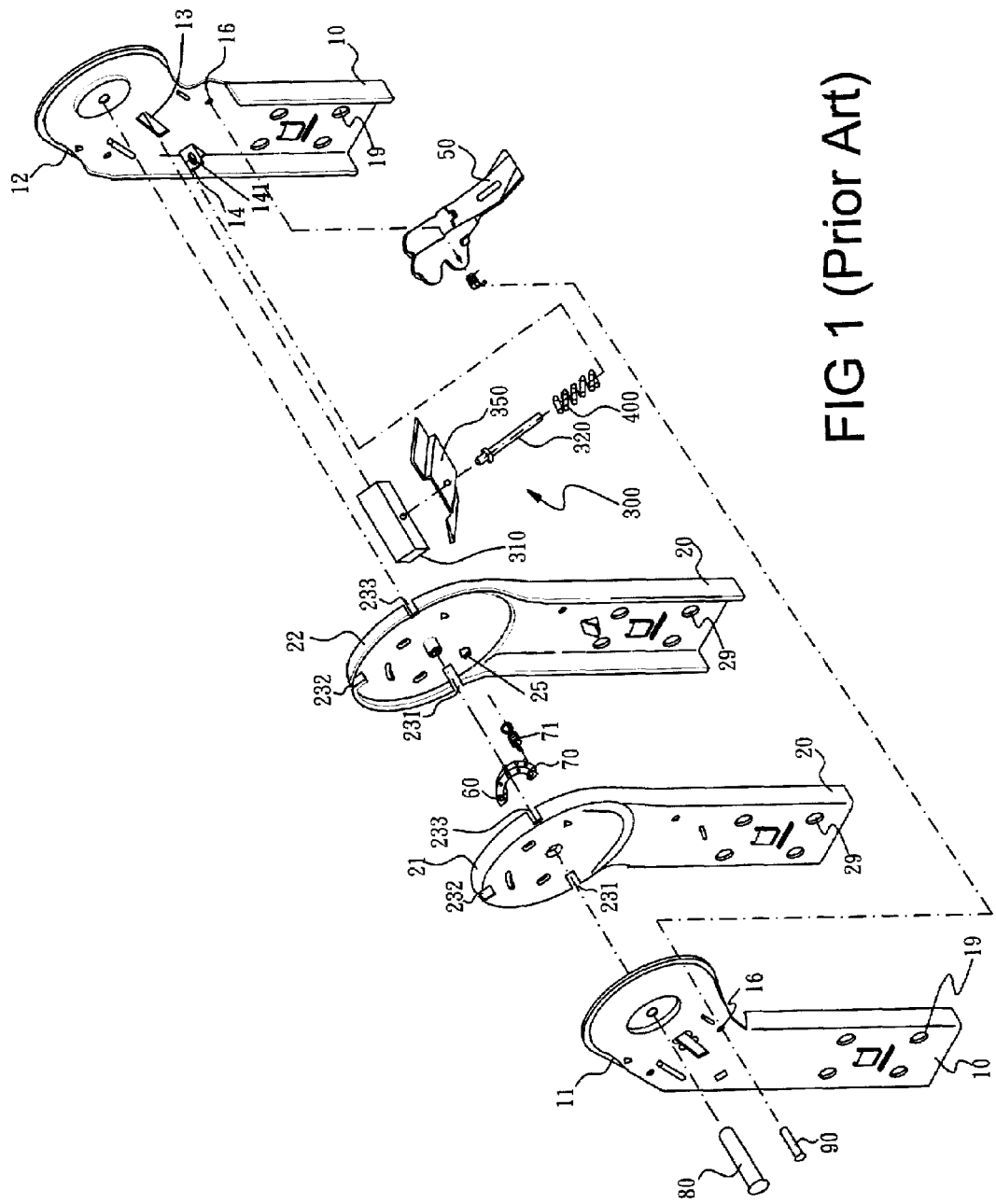
FIG. 1 is an exploded perspective view of an articulated joint illustrating the conventional lock device.
Figure 2:
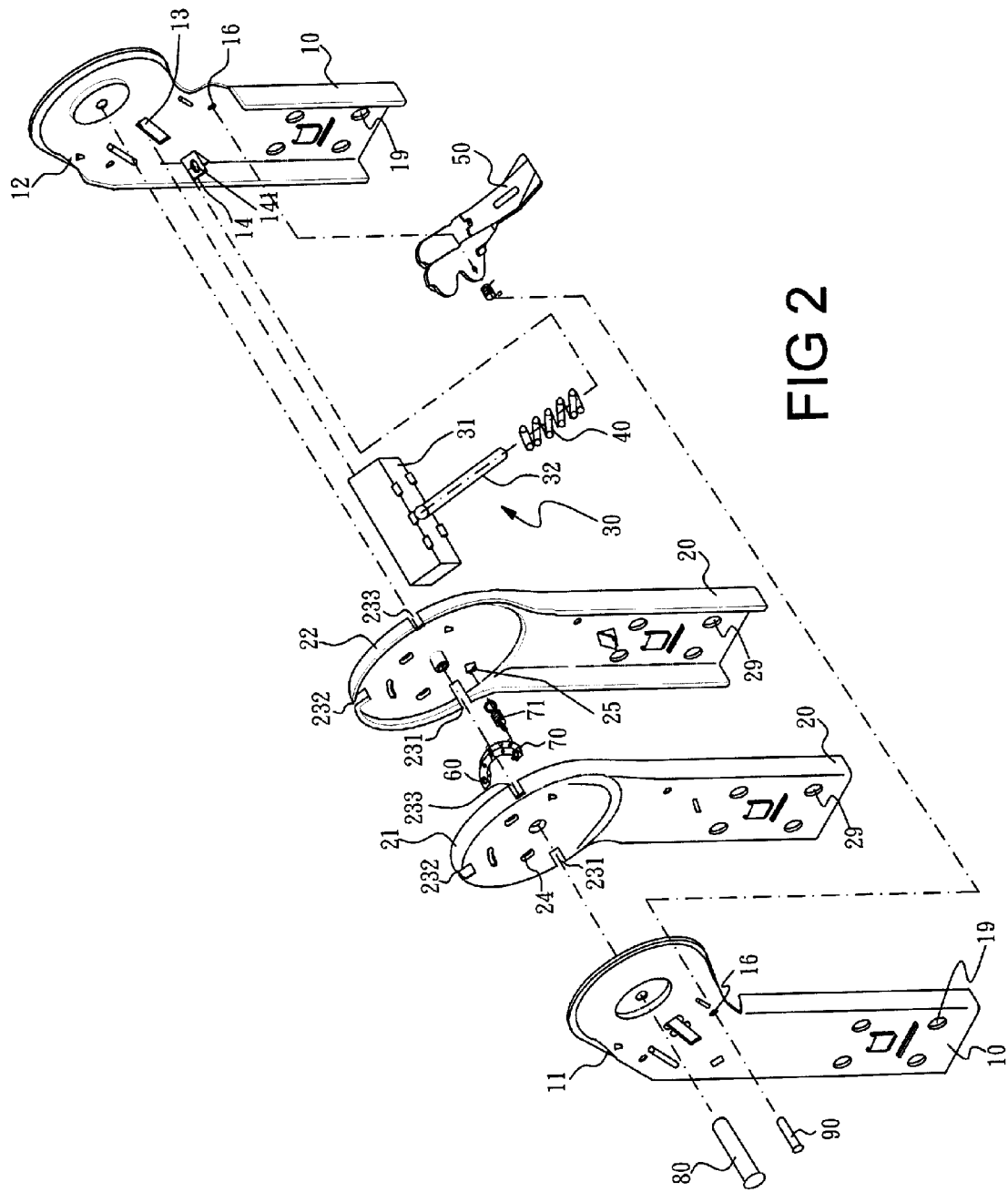
FIG. 2 is an exploded perspective view of an articulated joint illustrating a lock device according to the present invention.
Figure 5:
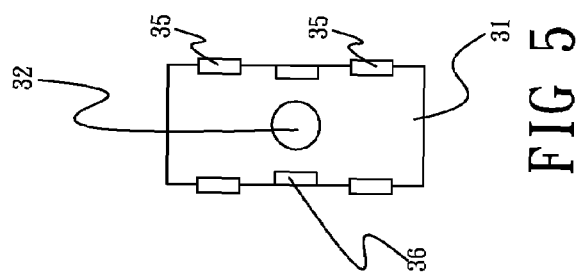
FIG. 5 is a plan view illustrating locations of the projections on the secure block.

Referring to FIGS. 2 to 5, an articulated joint with a lock device according to the present invention is illustrated. It is noted that identical parts as shown in FIG. 1 are designated the same reference numerals. In order to overcome the preceding deficiency resided in the conventional lock device, it can be seen in FIGS. 2 and 3 that the lock device 30 of the present invention includes a lock block 31 and a fixing pin 32. The center of a lateral side of the lock block 31, i.e., the center of the bottom side of the lock block 31 as shown in FIG. 5, provides a locating hole 33 and the fixing pin 32 provides a ball end corresponding to the locating hole 33, so as to slightly pivotally fit with the locating hole 33. It is noted that the ball end of the fixing pin 32 has a diameter greater than that of the main body of the fixing pin 32 to allow the lock block 31 being pivotally attached to the fixing pin 32.

Figure 4:
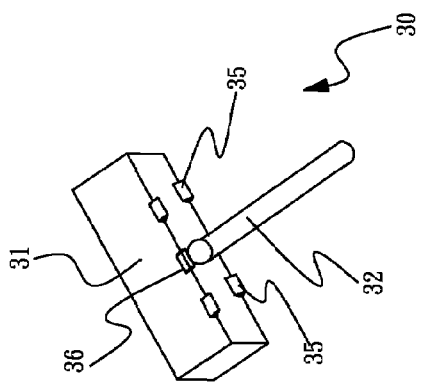
FIG. 4 is a perspective view illustrating the lock device 30 being assembled with riveting and stamped projections on the secure block thereof.
Figure 3:
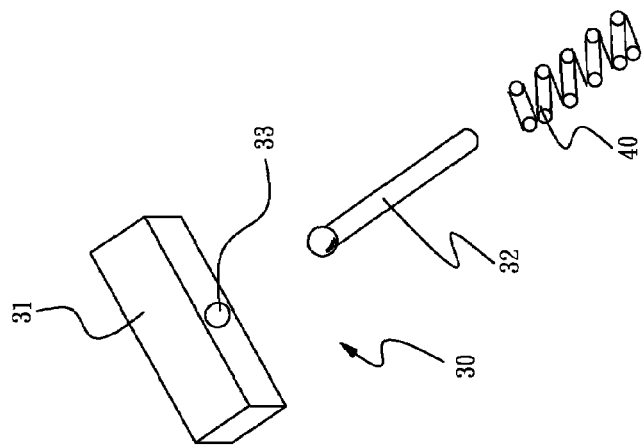
FIG. 3 is an exploded perspective view of the lock device 30 in FIG. 2.

Referring to FIGS. 4, 5 and 7, the two long opposite edges of the bottom side of the lock block 31 each are provided with a triangular prism shaped projection 35 near two short opposite edges of the bottom side of the lock block 31 respectively in a way of a distance from the respective projection to the respective short edge of the bottom side of the lock block 31 is equal to thickness of the respective outer shell 11, 12 as shown in FIG. 7 such that the projections 35 are capable of contacting with the inner sides of the outer shells 11, 12.

Referring to FIG. 7 in company with FIG. 2 again, two ends of the lock block 31 are slidably disposed at and the guide slot 13 at the outer casing shells 11, 12. It can be clearly seen in FIG. 7 that the ball end of the fixing pin 32 fits with the locating hole 33 and the another end of the fixing pin 32 passes through the spring seat 14 and the spring 40 is disposed to surround the fixing pin 32 with one end of the spring 40 biased against the bottom side of the lock block 31 and another end of the spring 40 biased against the spring seat 14. Originally, the lock block 31 is pushed upward to approach the top of the guide slot 13 and is capable of being caught by one of the locating recesses 231, 232, 233 before the trigger 50 is stirred (not shown). When the trigger 50 is stirred, the upper portion of the trigger 50 pushes the lock block 31 downward along the guide slot 13 under biasing force of the spring 40 as shown in FIG. 7 such that the lock block 31 is capable of moving away from the original engaged locating recess and the inner casing pair 20 is free from restriction of the lock block 31 to make angular adjustment of the articulated joint possible. The projections 35 perform a function of preventing the lock block 31 from loosening and falling off the guide slot 13 of the respective outer casing shell 11, 12 while the lock block 31 is pushed to move along the guide slot 13 so that steadiness of the articulated joint can be enhanced substantially.

Referring to FIG. 8 and in company with FIGS. 5 and 7, in order to secure the ball end of the fixing pin 32 in the locating hole 33 of the lock block 31 without loosening from each other, the middles of the two opposite long edges of the bottom side of the lock block 31 are pressed with a pressing tool to form two pressed spots 36 and result in the locating hole 33 is slightly deformed at the hole surface to squeeze the ball end as shown in FIG. 8. In this way, the ball end of the fixing pin 32 is capable of retaining in the locating hole in addition to pivotally being joined to the locating hole.

Figure 6:
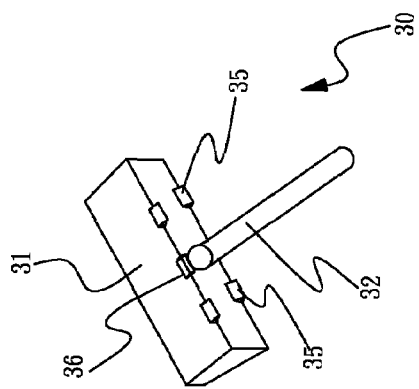
FIG. 6 is a perspective view illustrating another embodiment of the lock device according to the present invention.

Referring to FIG. 6, another embodiment of the lock device according to the present invention is illustrated. It can be seen that the lock block 31 has two slant opposite lateral sides and it results in a trapezoidal cross section with the side joining with the locating pin 32 being bigger than the opposite side thereof. The trapezoidal shape of the lock block 31 makes the lock block 31 entering the locating recesses 231, 232, 233 more smoothly and rapidly.

It is appreciated that the lock device according to the present invention provides a lock block being joined to the locating pin integrally with four triangular prism shaped projections being arranged on the lock block for not only being set up in the articulated joint easily but also overcoming the deficiency of parts of the lock device being loosened apart. Further, the pressed spots 36 allow the locating hole of lock block being slightly deformed for the ball end of the fixing pin being squeezed by the deformed locating hole and retaining in the locating hole in addition to being pivotally attached to the locating hole. Therefore, the lock device of the present invention enhances steadiness itself and avoids hazard resulting from the conventional lock device while a foldable ladder with the articulated joint is in operation.

While the invention has been described with reference to the preferred embodiments thereof, it is to be understood that modifications or variations may be easily made without departing from the spirit of this invention, which is defined by the appended claims.

What is claimed is:

1. An articulated joint for a foldable ladder comprising:
an outer casing pair with two opposite outer casing shells each having a guide slot and one of the outer casing shells providing a spring seat with a pinhole at the inner side thereof under the guide slot;
an inner casing pair with two opposite inner casing shells being disposed in the outer casing part and the respective inner casing shell having three locating recesses being provided at a circumferential side of thereof; and
a lock block set further comprising an elongated lock block, a fixing pin and a spring, the lock block having a bottom side with a locating hole at the center of the bottom side for being joined to a first end of the fixing pin, another end of the fixing pin passing through the pinhole, and the spring being disposed between the lock block and a spring seat to surround the pinhole;
characterized in that two triangular prism shaped projections are formed on each of two long edges of the bottom side of the lock block, respectively in a way of a distance from the respective projection to a neighboring short edge of the bottom side of the lock block being equal to a thickness of the respective outer casing shell such that both ends of the lock block are capable of being received in the guide slot respectively with an outwardly facing end of the respective projection keeping contact with the inner sides of the outer casing shells.

2. The articulated joint for a foldable ladder as defined in claim 1, wherein the respective long edge at the middle thereof has a pressed recess spot, which is pressed by a pressing tool, such that the locating hole is slightly deformed to squeeze the first end of the fixing pin to an extent of the first end being retained in and pivotally attached to the locating hole.

3. The articulated joint for a foldable ladder as defined in claim 2, wherein the first end of the fixing pin is a ball end, which has a diameter greater than that of the main body of the fixing pin to facilitate slight pivotal movement of the lock block.

* * * * *